US009435408B2

(12) United States Patent
Lindner (10) Patent No.: US 9,435,408 B2
(45) Date of Patent: Sep. 6, 2016

(54) TENSIONER FOR A CAMSHAFT-CAMSHAFT CHAIN DRIVE (71) Applicant: IWIS MOTORSYSTEME GMBH & CO. KG, Munich (DE)

(72) Inventor: Ulrich Lindner, Munich (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 0 days.

(21) Appl. No.: 14/720,373

(22) Filed: May 22, 2015

(65) Prior Publication Data
US 2015/0345596 A1    Dec. 3, 2015

(30) Foreign Application Priority Data

May 27, 2014  (DE) .......................... 10 2014 008 019

(51) Int. Cl.
*F16H 7/22* (2006.01)
*F16H 7/08* (2006.01)
*F01L 1/02* (2006.01)

(52) U.S. Cl.
CPC ............. *F16H 7/0836* (2013.01); *F01L 1/022* (2013.01); *F16H 2007/0806* (2013.01); *F16H 2007/0842* (2013.01); *F16H 2007/0872* (2013.01); *F16H 2007/0891* (2013.01)

(58) Field of Classification Search
CPC ............. F16H 2007/0806; F16H 7/08; F16H 2007/0812; F16H 2007/0878
USPC .................................................. 474/110, 111
See application file for complete search history.

(56) References Cited

U.S. PATENT DOCUMENTS

| 3,964,331 A | * | 6/1976 | Oldfield | ................ F16H 7/0836 |
| | | | | 474/110 |
| 4,553,509 A | * | 11/1985 | Mezger | ..................... F01L 1/02 |
| | | | | 123/192.1 |
| 4,902,266 A | * | 2/1990 | Ojima | ....................... F16H 7/08 |
| | | | | 474/111 |
| 5,035,680 A | * | 7/1991 | Ojima | ....................... F16H 7/08 |
| | | | | 474/138 |

(Continued)

FOREIGN PATENT DOCUMENTS

| DE | 2528199 A1 | 1/1976 |
| DE | 19740481 A1 | 3/1999 |

(Continued)

*Primary Examiner* — Henry Liu
(74) *Attorney, Agent, or Firm* — Baker and Hostetler LLP (57) ABSTRACT A tensioner, for a camshaft-camshaft chain drive with a drive chain and camshaft bearing bridge for fastening camshaft bearings to an engine block, comprises a tensioner housing with a guiding-side guide shoe, a tensioning piston slidably guided in a piston bore of the tensioner housing and provided with a tensioning-side tensioning shoe, and a fastening flange projecting laterally from the tensioner housing and having a mounting surface facing the tensioning side. A mounting plane defined by the mounting surface of the fastening flange intersects the tensioner housing at an axial distance from the guiding surface of the guide shoe at most 40% of axial transport length of the tensioner between the guiding surface of the guide shoe and the tensioning surface of the tensioning shoe. The camshaft bearing bridge has a contact surface for the fastening flange, to be in contact with the mounting surface of the fastening flange. A camshaft-camshaft chain drive for an internal combustion engine comprising such a tensioner is provided, where the camshaft bearing bridge can be attached to an engine block component.

9 Claims, 5 Drawing Sheets (56) References Cited

U.S. PATENT DOCUMENTS

| | | | | |
|---|---|---|---|---|
| 5,055,089 A * | 10/1991 | Ojima | | F16H 7/1272 474/138 |
| 5,073,158 A * | 12/1991 | Ojima | | F16H 7/08 474/111 |
| 5,197,420 A * | 3/1993 | Arnold | | F01L 1/348 123/90.15 |
| 5,246,404 A * | 9/1993 | Ojima | | F16H 7/08 474/111 |
| 5,370,584 A * | 12/1994 | Todd | | F16H 7/08 474/110 |
| 5,597,367 A * | 1/1997 | Trzmiel | | F01L 1/02 474/110 |
| 5,676,614 A * | 10/1997 | Inoue | | F16H 7/08 474/110 |
| 5,782,625 A * | 7/1998 | Young | | F16H 7/08 474/110 |
| 5,885,179 A * | 3/1999 | Lewis | | F16H 7/08 474/110 |
| 5,989,139 A * | 11/1999 | Dusinberre, II | | F16H 7/08 474/110 |
| 6,093,123 A * | 7/2000 | Baddaria | | F01L 1/02 474/110 |
| 6,129,644 A * | 10/2000 | Inoue | | F16H 7/0836 474/101 |
| 6,205,965 B1 * | 3/2001 | Stephan | | F01L 1/348 123/90.15 |
| 6,435,992 B2 * | 8/2002 | Wakabayashi | | 474/101 |
| 6,447,415 B1 * | 9/2002 | Hashimoto | | F16H 7/08 474/109 |
| 6,482,116 B1 * | 11/2002 | Ullein | | F16H 7/08 474/101 |
| 6,599,209 B1 * | 7/2003 | Ullein | | F16H 7/08 474/111 |
| 7,513,844 B2 * | 4/2009 | Matsushita | | F16H 7/0836 474/109 |
| 7,641,576 B2 * | 1/2010 | Redaelli | | F16H 7/08 474/109 |
| 8,523,720 B2 * | 9/2013 | Reinhart | | F16H 7/0848 29/525.01 |
| 2009/0186725 A1 * | 7/2009 | Jouraij | | F01L 1/022 474/110 |

FOREIGN PATENT DOCUMENTS

| | | |
|---|---|---|
| DE | 19748163 A1 | 5/1999 |
| DE | 10341799 A1 | 4/2005 |

* cited by examiner

TENSIONER FOR A CAMSHAFT-CAMSHAFT CHAIN DRIVE

CROSS-REFERENCE TO RELATED APPLICATION

This application claims priority to foreign German patent application No. DE 102014008019.6, filed on May 27, 2014, the disclosure of which is incorporated by reference in its entirety.

FIELD OF THE INVENTION

The present invention relates to a tensioner for a camshaft-camshaft chain drive with a drive chain and a camshaft bearing bridge for fixing associated camshaft bearings to an engine block component. The tensioner comprises a tensioner housing with a guiding-side guide shoe, a tensioning piston slidably guided in a piston bore of the tensioner housing and provided with a tensioning-side tensioning shoe, and a fastening flange projecting laterally from the tensioner housing on one side of the latter and having a mounting surface that faces the tensioning side. The invention additionally relates to a camshaft-camshaft chain drive for an internal combustion engine, comprising at least two camshaft chain wheels, a drive chain laid around and connecting the two camshaft chain wheels as well as said tensioner which tensions the drive chain. In addition, the present invention relates to the use of such a tensioner for fastening a camshaft bearing bridge to an engine block.

BACKGROUND

In timing drives of internal combustion engines, such tensioners with a guiding-side guide shoe and a tensioning-side tensioning shoe are used in particular for camshaft-camshaft chain drives. The drive chain connects two juxtaposed camshafts of one cylinder bank, the guide shoe being provided on the driving side, viz. the taut span of the drive chain, and the tensioning shoe on the loose driven side, viz. the slack span of the drive chain, so as to maintain a predetermined chain tension. If, due to wear, the tension of the drive chain changes, a reliable operation of the timing drive of the internal combustion engine requires compensating the chain elongation via the tension of the drive chain in the slack span and maintaining the necessary pretension in the taut span.

A tensioner for a chain drive between two camshafts is known e.g. from U.S. Pat. No. 5,782,625. The chain tensioner shown in this reference comprises a housing as well as a tensioning piston, which is longitudinally movable in a piston bore of the housing and which is provided with a tensioning shoe on its tensioning-side end projecting beyond the piston bore. The tensioner housing is provided with a guide shoe on the guiding side facing away from the tensioning piston and has a fastening flange, which projects laterally from the center of the tensioner housing on one side of the latter and which comprises two fastening apertures and a connection for the hydraulic fluid. This tensioner is secured to the engine block of an internal combustion engine by means of bolts extending through the fastening apertures of the fastening flange. The hydraulic fluid connection provided in the mounting surface establishes a connection to the circuit of the engine oil, which, starting from the hydraulic fluid connection, is fed via a hydraulic fluid line inclined in the direction of the guide shoe, through the fastening flange and into the damping pressure chamber of the tensioner.

Although this tensioner and other tensioners known from the prior art proved to be successful in use, especially when used in timing chain drives of internal combustion engines, there are frequently cases of use which necessitate an adaptation of the structural design or a modified basic concept. It is precisely the compact design of modern, innovative internal combustion engines that necessitates not only a structural adaptation of known tensioners but also completely new concepts for the construction of tensioners in an increasing number of times.

SUMMARY OF THE INVENTION

Therefore, it is the object of the present invention to provide a tensioner for a camshaft-camshaft chain drive, which is adapted to the compact installation space situation and to additional challenges presented by modern internal combustion engines.

According to the present invention, this object is achieved in that a mounting plane defined by the mounting surface of the fastening flange intersects the tensioner housing at an axial distance from the guiding surface of the guide shoe which corresponds to at most 40% of the axial transport length of the tensioner between the guiding surface of the guide shoe and the tensioning surface of the tensioning shoe, wherein the mounting surface of the fastening flange is adapted to be brought into contact with a contact surface of a camshaft bearing bridge for the fastening flange. The high rotational speeds of the camshafts and the alternating loads through the cams superimposed thereon as well as the vibrations occurring in timing drives require suitable camshaft bearings in the vicinity of the drive of the camshafts, said camshaft bearings being fixed to the engine block by means of a suitable camshaft bearing bridge. A tensioner for a camshaft-camshaft chain drive configured according to the present invention allows the chain drive to be positioned close to the camshaft bearings associated therewith and it also allows a close positioning of the two camshafts, since a separate contact surface on the engine block or on an engine block component can be dispensed with due to the fact that the camshaft bearing bridge is fastened by means of the fastening flange of the tensioner, and since the tensioner is reliably fixed to the engine block through the fasteners of the camshaft bearing bridge. When the mounting surface of the fastening flange is in contact with the contact surface of the camshaft bearing bridge, the mounting plane defined by the mounting surface intersects the tensioner housing at an axial distance, viz. a distance along the longitudinal axis of the tensioning piston, from the guiding surface of the guide shoe which corresponds to at most 40% of the axial transport length of the tensioner, i.e. the distance between the guiding surface of the guide shoe and the tensioning surface of the tensioning shoe of the tensioner at a locked transport position of the tensioner. The axial transport length of the tensioner is determined by the distance between the guiding surface of the guide shoe, which is arranged on the guiding side of the tensioner housing, and the tensioning surface of the tensioning shoe, which is arranged on the tensioning side of the tensioning piston, along the axially extending longitudinal axis of the tensioning piston. When the transport locking means has been released, the tensioning surface of the tensioning shoe is in contact with the drive chain when the tensioner is in operation. The axial distance of the mounting surface, which corresponds to at most 40% of the axial transport length, generates, in spite of the arrangement of the mounting surface of the fastening flange on the high contact surface of the camshaft bearing bridge, only minor alternating loads on the fastening flange and allows thus not only normal screw fastening but also a dimensioning of the fastening flange with a small flange thickness.

According to another embodiment, the axial distance, at which the plane defined by the mounting surface of the fastening flange is spaced apart from the guiding surface of the guide shoe, is between 0 and 25% of the axial transport length of the tensioner. This kind of arrangement of the fastening flange allows the use of camshaft bearing bridges having a large material thickness and/or an exposed position of the contact surface which is adapted to be brought into contact with the mounting surface of the fastening flange. The lower value of the range of 0% of the axial transport length comprises here also possible negative values, in the case of which the plane defined by the mounting surface of the fastening flange no longer intersects the tensioner housing, but intersects the axis of the tensioning piston in the area of guiding-side guide shoe or beyond the guide shoe.

According to a preferred embodiment of the tensioner for a camshaft-camshaft chain drive, the fastening flange has at least one fastening hole formed in the mounting surface, a fastener of the camshaft bearing bridge being adapted to be accommodated in the at least one fastening hole of the fastening flange and the camshaft bearing bridge being adapted to be fixed to the engine block by means of the fastening flange. Providing a fastening hole in the mounting surface and accommodating a fastener in said fastening hole allows simple and efficient fastening of the camshaft bearing bridge to the engine block. For fastening the fastening flange to the engine block such that it is secured against rotation relative thereto, at least two fastening holes may have provided the mounting surface of the fastening flange.

According to another embodiment, the mounting surface has formed therein a hydraulic fluid connection, said hydraulic fluid connection in the fastening flange being adapted to be connected to a hydraulic fluid outlet in the contact surface of the camshaft bearing bridge, so as to supply a hydraulic fluid damping pressure chamber, which is provided for damping the retraction movement of the tensioning piston, with a hydraulic fluid by means of a hydraulic fluid passage through the fastening flange and the tensioner housing. This allows the hydraulic fluid pressure chamber, which is normally located in the piston bore of the tensioner housing, to be easily supplied with the engine oil used as hydraulic fluid, without any additional connection means or additional hydraulic fluid lines outside of the tensioner and the camshaft bearing bridge being required. In order to allow a reliable damping function for the tensioning piston and a reliable operation of the tensioner, a check valve may be provided, which may be arranged within the hydraulic fluid passage or directly in front of the hydraulic fluid pressure chamber.

The present invention additionally relates to a camshaft-camshaft chain drive for an internal combustion engine, comprising at least two camshaft chain wheels, a circulating drive chain laid around and connecting the two camshaft chain wheels and a camshaft bearing bridge for fastening associated camshaft bearings to an engine block component as well as a tensioner of the type described hereinbefore, which tensions the drive chain, the camshaft bearing bridge being adapted to be attached to the engine block component by means of the fastening flange of the tensioner. This allows easy mounting of the camshaft bearing bridge and of the tensioner even if the space available in the engine compartment is very limited. For accomplishing easy, efficient mounting, the fastening flange of the tensioner may have at least one fastening hole formed in the mounting surface, and a fastener of the camshaft bearing bridge may extend through the at least one fastening hole of the fastening flange so as to reliably fix the camshaft bearing bridge to the engine block by means of the fastening flange.

Furthermore, the present invention also relates to the use of an above-described tensioner for fastening a camshaft bearing bridge, wherein a mounting surface of a fastening flange projecting laterally from a tensioner housing on one side of the latter is in contact with a contact surface of the camshaft bearing bridge so as to fix the camshaft bearing bridge to an engine block component. This combination of a plurality of components at one location in the internal combustion engine allows synergy effects in engine component mounting as well as the multiple use of fastening positions, whereby the compactness of the engine can be increased. According to an advantageous embodiment, a fastener of the camshaft bearing bridge may extend through at least one fastening hole of the fastening flange. The camshaft bearing bridge and the tensioner can thus be fastened easily and reliably in one mounting step. Optionally, a hydraulic fluid connection may be provided in the mounting surface of the fastening flange, said hydraulic fluid connection communicating with a hydraulic fluid outlet in the contact surface of the camshaft bearing bridge so as to reliably supply the tensioner with a hydraulic fluid, without any additional connection elements being required.

BRIEF DESCRIPTION OF THE DRAWINGS

In the following, an embodiment of the present invention will be explained in more detail making reference to the drawings, in which.

DETAILED DESCRIPTION

Figure 1:
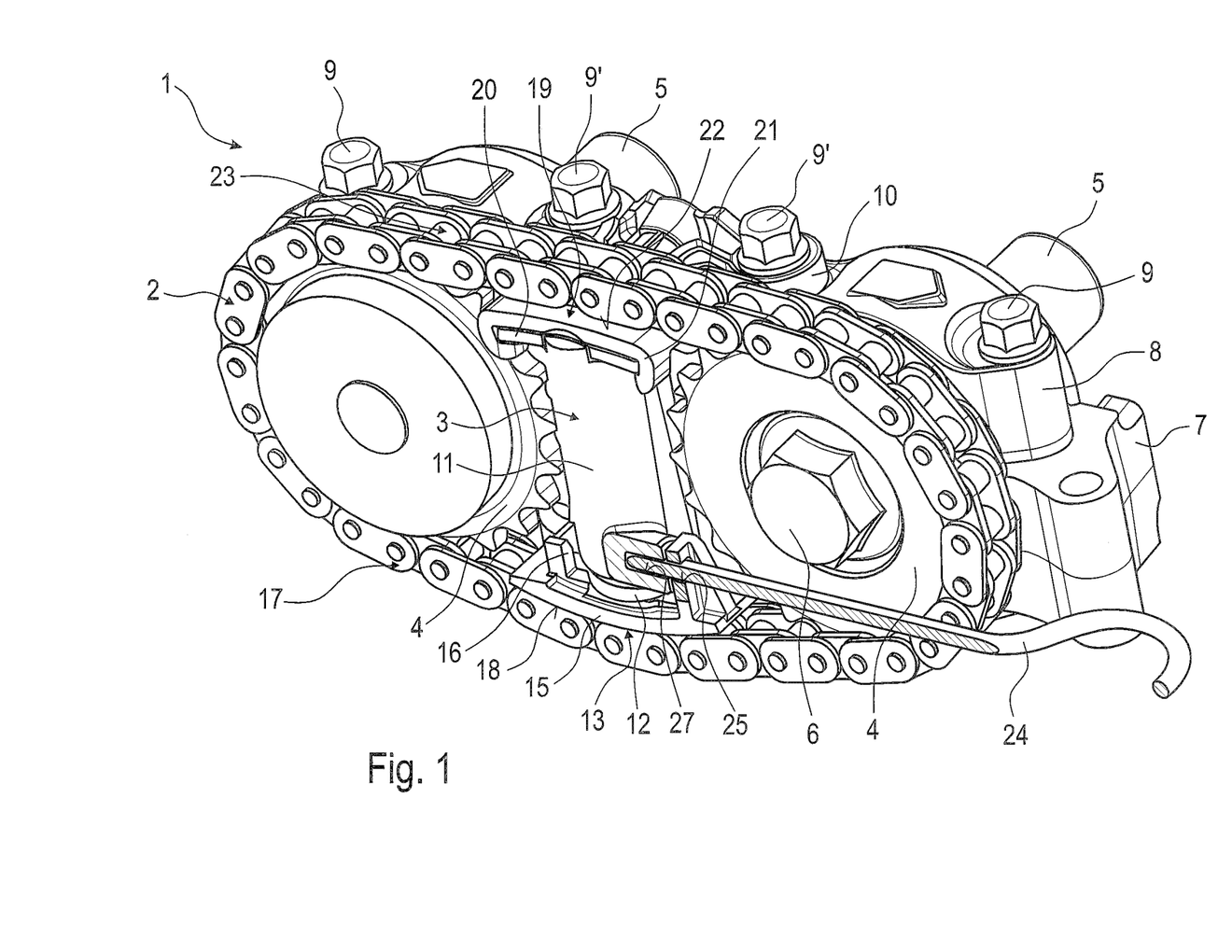
FIG. 1 shows a perspective side view of a chain drive with a tensioner according to the present invention.

The perspective side view of the chain drive 1 comprising a circulating drive chain 2, a tensioner 3 and two chain wheels 4 connected by means of the circulating drive chain 2 in FIG. 1 shows clearly the typical structural design of a camshaft-camshaft chain drive 1 for coupling two camshafts 5 of an internal combustion engine with one another. The tensioner 3 is positioned between the two chain wheels 4.

The chain wheels 4 are fixedly mounted on the ends of the camshafts 5, e.g. by means of a screw 6, the ends of the camshafts 5 being supported in bearings (not shown) accommodated in a bearing seat provided on an engine block component 7 or directly on the engine block, where they are secured in position by means of the camshaft bearing bridge 8. The camshaft bearing bridge 8 is fixedly screwed to the engine block component 7 by means of four bolts 9. The two middle bolts 9' extend also through the fastening flange 10 of the tensioner 3.

The tensioner 3 comprises a tensioner housing 11 and a tensioning piston 12, which is slidably guided in a piston bore of the tensioner housing 11 and which exits the tensioner housing 11 on the tensioning side 13. On the tensioning end of the tensioning piston 12 exiting the tensioner housing 11, a tensioning shoe 15 is, by means of suitable snap-in elements 16, clipped onto a flange plate 14 on said tensioning end of the tensioning piston 12. The tensioning surface 18 of the tensioning shoe 15, which is in contact with the drive chain 2 in the slack span 17 of the chain drive 1, tensions the drive chain 2 over the chain wheels 4 when the chain drive 1 is in operation. On the guiding side 19, which is located opposite the tensioning side 13, a guide shoe 21 is secured to a housing flange 20, the guiding surface 22 of said guide shoe 21 being in contact with the chain drive 1 and guiding the drive chain 2 in the taut span 23. In addition, the tensioner 3 is fixed at a transport position by means of a transport locking pin 24. To this end, the transport locking pin 24 extends through an opening 25 on a rear projection 26 on the tensioning shoe 15 and into a lock hole 27 provided on the tensioner housing 11. For transferring the tensioner 3 from the transport position to an operating position, the transport locking pin 24 is removed from the lock hole 27 and the opening 25.

FIG. 2a shows again the tensioner 3 of the camshaft-camshaft chain drive according to FIG. 1 in a perspective view. In addition to the fastening of the tensioning shoe 15 on the flange plate 14 at the tensioning end of the tensioning piston 12 by means of a plurality of snap-in elements 16, the transport locking pin 24 is here clearly shown once more, said transport locking pin 24 retaining the tensioning piston 12 at the transport position via the opening 25 in the rear projection 26 on the tensioning shoe 15 and the lock hole 27 in the tensioner housing 11. Furthermore, the guiding surface 22 of the guide shoe 21, which is secured to the housing flange 20 of the tensioner housing 11, can be seen. At the transport position of the tensioner 3, which is shown in FIG. 2a, the axial distance resulting along the longitudinal axis of the tensioning piston 12 between the guiding surface 22 of the guide shoe 21 and the tensioning surface 18 of the tensioning shoe 15 is identified as axial transport length $T_L$.

Figure 2A:
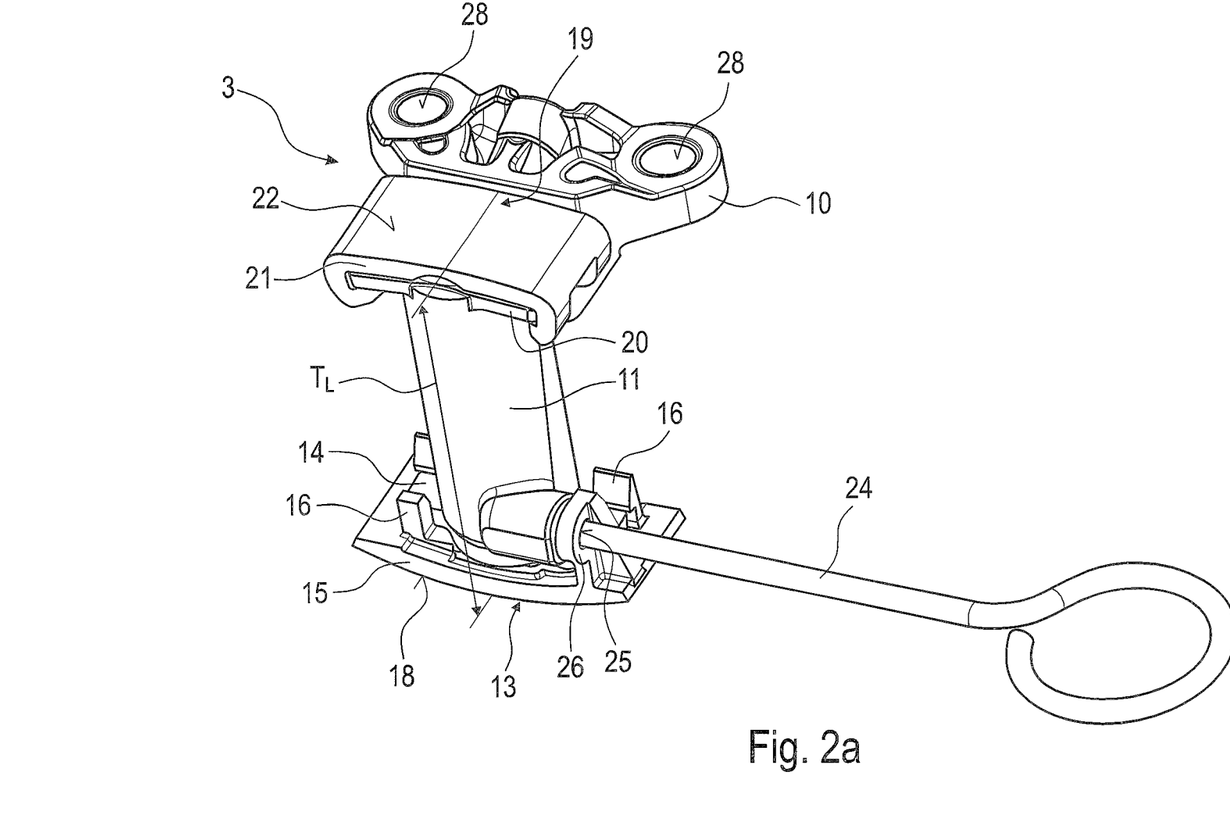
FIG. 2a shows a perspective side view of the tensioner according to FIG. 1.

As can clearly be seen, the fastening flange 10 of the tensioner 3 according to the present invention lies in FIG. 2a approximately on the same level as the guide shoe 21 on the guiding side 19 of the tensioner housing 11, each of the ends of the fastening flange 10 having provided therein a fastening hole 28, said fastening holes 28 extending through the fastening flange 10.

Figure 2B:
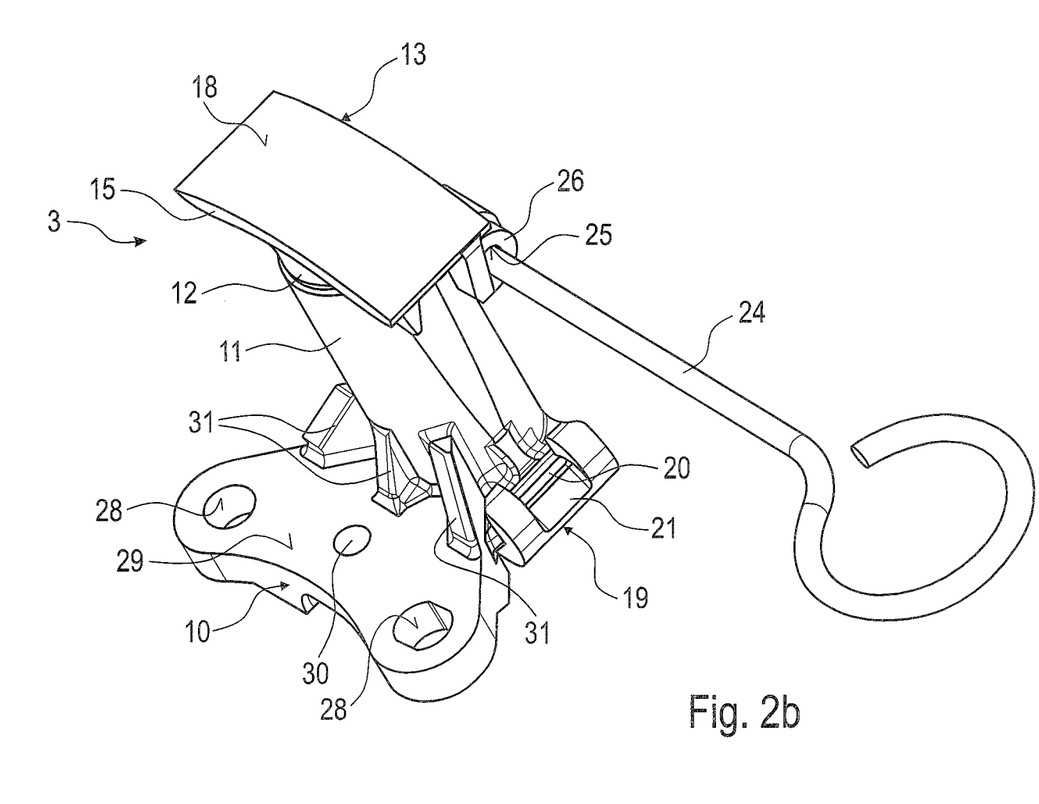
FIG. 2b shows a perspective view from below of the tensioner according to FIG. 1.

The perspective view of the tensioner 3 in FIG. 2b from the direction of the tensioning side 13 allows a top view of the tensioning-side mounting surface 29 of the fastening flange 10. The mounting surface 29 extends perpendicular to the longitudinal axis of the tensioning piston 12 across the whole fastening flange 10 projecting on one side from the tensioner housing 11. In addition to the fastening holes 28, which are arranged at the outer corners of the kidney-shaped fastening flange 10, the mounting surface 29 has centrally formed therein a hydraulic fluid connection 30 through which the hydraulic fluid damping pressure chamber 37 of the tensioner 3 is supplied with a hydraulic fluid. At the transition of the mounting surface 29 to the cylindrical tensioner housing 11, three stiffening bars 31 are provided, which reduce the strong loads acting on the connection between the fastening flange 10 and the tensioner housing 11 when a force, which is augmented through the long lever arm between the tensioning shoe 15 and the fastening flange 10, is applied to the connection points in the case of strong vibrations or jolts of the drive chain 2, thus helping to avoid damage of the connection between the fastening flange 10 and the tensioner housing 11 during operation. Also in this figure, it can clearly be seen that the fastening flange 10 with the mounting surface 29 is positioned approximately on the same level as the housing flange 20 with the clipped-on guide shoe 21.

Figure 2C:
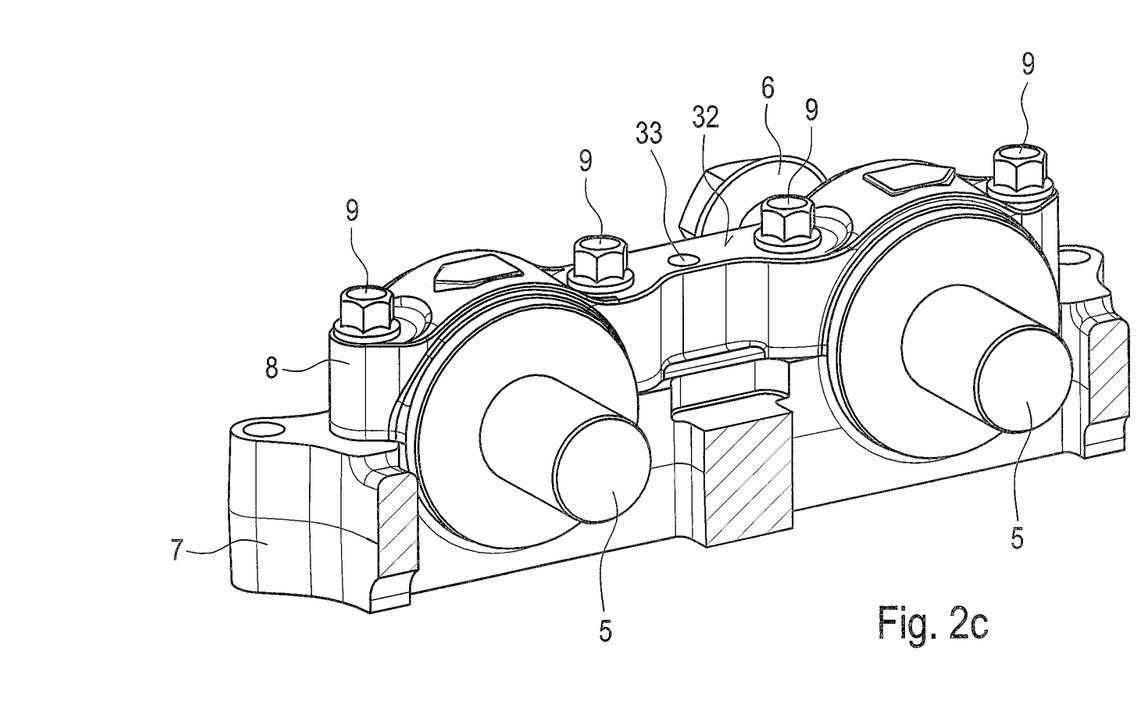
FIG. 2c shows a perspective view of the associated camshafts of the chain drive according to FIG. 1

FIG. 2c shows a perspective view of the camshaft bearing bridge 8, which is secured in position on the engine block component 7, from the direction of the camshafts 5 which, through the camshaft bearings (not shown) fixed between the engine block component 7 and the camshaft bearing bridge 8, extend to a camshaft-camshaft chain drive 1 provided at the back of the camshaft bearing bridge 8. The camshaft bearing bridge 8 extends as one component across the camshaft bearings of the juxtaposed camshafts 5 and is fixed to the engine block component 7 by means of four bolts 9 so as to secure the camshaft bearings in position. The engine block component 7 may here be a part of the engine block or of the cylinder head or some other component that is fixedly connected to the engine block. The bolts 9 extend in closely spaced relationship with the camshaft bearings on both sides of the camshaft bearings through the camshaft bearing bridge 8 and into the engine block component 7 so as to reliably fix the camshaft bearings that have high loads applied thereto. The contact surface 32, which is provided for contact with the mounting surface 29 of the fastening flange 10 of the tensioner 3, extends between the two middle bolts 9. The contact surface 32 extends here up to and beyond the holes provided in the camshaft bearing bridge 8 for accommodating the bolts 9, up to a point in the vicinity of the camshaft bearings. The two holes for accommodating the bolts 9 have provided between them a hydraulic fluid outlet 33, which is located centrally in the contact surface 32 and which communicates with the engine oil circuit of the internal combustion engine so as to supply engine oil to the damping pressure chamber 37 of the tensioner 3 for damping the tensioning piston 12.

Figure 3:
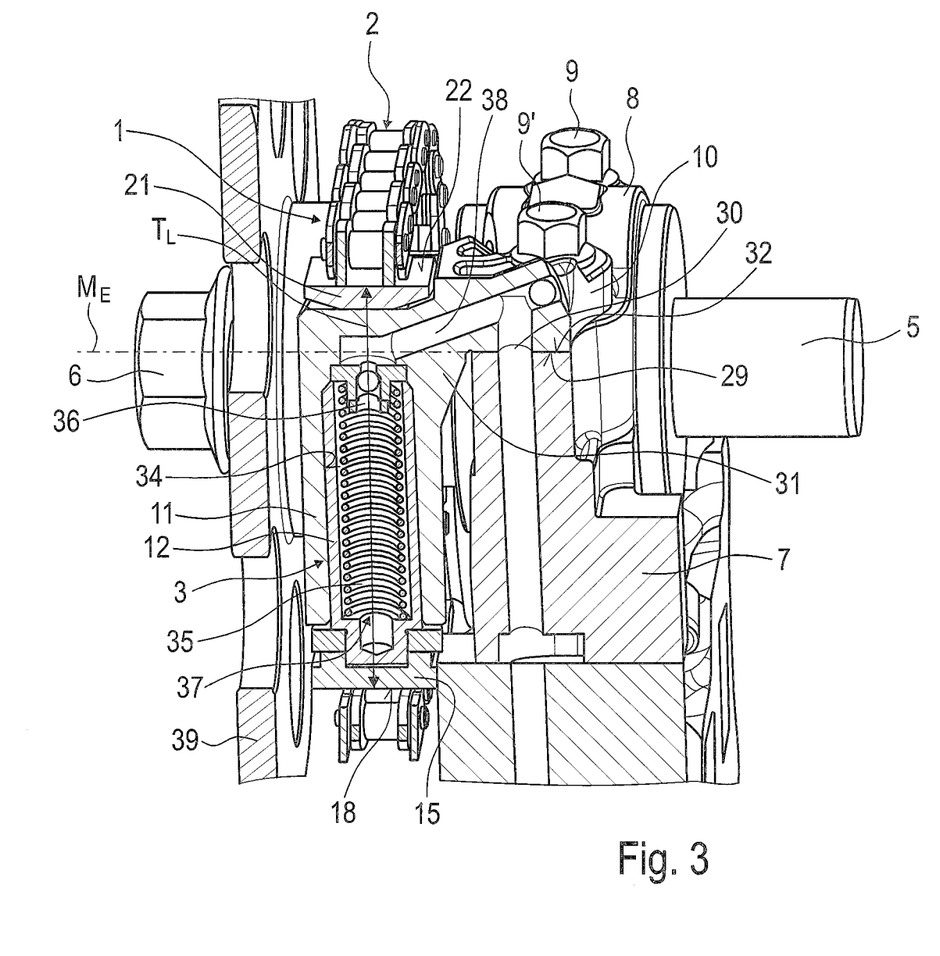
FIG. 3 shows a sectional view of the chain drive according to FIG. 1.

FIG. 3 shows a section through the camshaft-camshaft chain drive 1 and the tensioner 3 according to the present invention perpendicular to the plane of circulation of the drive chain 2. In addition to the tensioning piston 12, which is guided in a piston bore 34 of the tensioner housing 11, also the piston spring 35 arranged within the hollow-cylindrical tensioning piston 12 and used for biasing the tensioning piston 12 can be seen in said figure as well as, at the end of the piston bore 34, a check valve 36 fixed by means of the piston spring 35, said check valve 36 closing the damping pressure chamber 37 against the hydraulic fluid passage 38 through the tensioner housing 11 and the fastening flange 10. The damping pressure chamber 37 is connected to the engine oil circuit via the hydraulic fluid passage 38, the hydraulic fluid connection 30 in the mounting surface 29 as well as the hydraulic fluid outlet 33 in the contact surface 32, cf. FIG. 2b.

The mounting surface 29 of the fastening flange 10 is in contact with the contact surface 32 of the camshaft bearing bridge 8 such that it is flush therewith, so that the hydraulic fluid connection 30 in the mounting surface 29 and the hydraulic fluid outlet 33 of the camshaft bearing bridge 8 are in alignment or at least in fluid communication with one another so as to guarantee the supply of pressurized hydraulic fluid to the damping pressure chamber 37. The two middle bolts 9' used for fixing the camshaft bearing bridge 8 extend through the fastening holes 28 of the fastening flange 10 and the camshaft bearing bridge 8 up to and into the engine block component 7 and fix the camshaft bearing bridge 8 in position on the engine block component 7 via the mounting surface 29 of the fastening flange 10 that is pressed onto the contact surface 32 of the camshaft bearing bridge 8. The middle bolts 9' are slightly longer than the lateral bolts 9 so as to compensate for the additional length of the fastening holes 28 of the fastening flange 10.

FIG. 3 additionally shows the mounting plane $M_E$, which is defined by the mounting surface 29 of the fastening flange 10 and which intersects the tensioner housing 11 at a comparatively small distance from the guiding surface 22 of the guide shoe 21. Likewise, said figure also shows the axial transport length $T_L$ of the tensioner 3 at the transport position fixed by means of the transport locking pin 24, said axial transport length $T_L$ extending along the longitudinal axis of the tensioning piston 12 from the guiding surface 22 on the guiding side 19 of the tensioner housing 11 to the tensioning surface 18 on the tensioning side 13 of the tensioning piston 12. Since the mounting plane $M_E$ intersects the tensioner housing 11 of the tensioner 3 in comparatively close vicinity to the guiding surface 22 of the guide shoe 21, the hydraulic fluid passage 38 in the fastening flange 10 extends through said fastening flange 10 at an angle of 10° to 30° inclined in the direction of the tensioning side 13 so as to connect the hydraulic fluid connection 30 in the mounting surface 29 with the check valve 36 and the damping pressure chamber 37, respectively. In addition, FIG. 3 shows the drive wheel 39 of the chain drive 1, said drive wheel 39 being, in addition to the chain wheel 4, fixed to a camshaft 5 by means of the screw 6 and driving the chain drive 1 by means of a timing chain meshing with said chain drive 1.

LIST OF REFERENCE NUMERALS 1 chain drive
2 drive chain
3 tensioner
4 chain wheels
5 camshafts
6 screw
7 engine block component
8 camshaft bearing bridge
9, 9' bolts
10 fastening flange
11 tensioner housing
12 tensioning piston
13 tensioning side
14 flange plate
15 tensioning shoe
16 snap-in elements
17 slack span
18 tensioning surface
19 guiding side
20 housing flange
21 guide shoe
22 guiding surface
23 taut span
24 transport locking pin
25 opening
26 projection
27 lock hole
28 fastening hole
29 mounting surface
30 hydraulic fluid connection
31 stiffening bars
32 contact surface
33 hydraulic fluid outlet
34 piston bore
35 piston spring
36 check valve
37 damping pressure chamber
38 hydraulic fluid passage
39 drive wheel
$T_L$ axial transport length
$M_E$ mounting plane

The invention claimed is:

1. A tensioner for a camshaft-camshaft chain drive having a drive chain and a camshaft bearing bridge for fastening associated camshaft bearings to an engine block component, the tensioner comprising:
    a tensioner housing having a guide shoe provided at a guiding side of the tensioner housing,
    a tensioning piston is slidably guided in a piston bore of the tensioner housing, the tensioning piston having a tensioning shoe provided at a tensioning side opposite to the guiding side, and a fastening flange projecting on one side of and laterally from the tensioner housing, the fastening flange having a mounting surface that faces the tensioning side;
    wherein a mounting plane defined by the mounting surface of the fastening flange intersects the tensioner housing at an axial distance from a guiding surface of the guide shoe which corresponds between 0 and 40% of the axial transport length of the tensioner between the guiding surface of the guide shoe and a tensioning surface of the tensioning shoe at a locked transport position of the tensioner; and
    wherein the camshaft bearing bridge has a contact surface for receiving the fastening flange, wherein the mounting surface of the fastening flange is in contact with said contact surface.

2. The tensioner for a camshaft-camshaft chain drive according to claim 1, wherein the axial distance, at which the mounting plane defined by the mounting surface of the fastening flange is spaced apart from the guiding surface of the guide shoe, is between 0 and 25% of the axial transport length of the tensioner at a locked transport position.

3. The tensioner for a camshaft-camshaft chain drive according to claim 1, wherein the fastening flange has at least one fastening hole formed in the mounting surface, wherein a fastener of the camshaft bearing bridge is received in the at least one fastening hole of the fastening flange and the camshaft bearing bridge is fixed to the engine block component by means of the fastening flange.

4. The tensioner for a camshaft-camshaft chain drive according to claim 3, wherein at least two fastening holes are formed in the mounting surface of the fastening flange.

5. The tensioner for a camshaft-camshaft chain drive according to claim 1, wherein the mounting surface has formed therein a hydraulic fluid connection, said hydraulic fluid connection in the fastening flange is connected to a hydraulic fluid outlet in the contact surface of the camshaft bearing bridge so as to supply a hydraulic fluid damping pressure chamber with a hydraulic fluid by means of a hydraulic fluid passage through the fastening flange and the tensioner housing.

6. The tensioner for a camshaft-camshaft chain drive according to claim 5, wherein a check valve is provided, said check valve is arranged within the hydraulic fluid passage.

7. The tensioner for a camshaft-camshaft chain drive according to claim 5, wherein a check valve is provided, said check valve is arranged in front of the hydraulic fluid damping pressure chamber.

8. A camshaft-camshaft chain drive for an internal combustion engine, comprising at least two camshaft chain wheels, a drive chain connecting the two camshaft chain wheels and a camshaft bearing bridge for fastening associated camshaft bearings to an engine block component as well as a tensioner, the tensioner comprising:

a tensioner housing having a guide shoe provided at a guiding side of the tensioner housing, a tensioning piston is slidably guided in a piston bore of the tensioner housing, the tensioning piston having a tensioning shoe provided at a tensioning side opposite to the guiding side, and a fastening flange projecting on one side of and laterally from the tensioner housing, the fastening flange having a mounting surface that faces the tensioning side;

wherein a mounting plane defined by the mounting surface of the fastening flange intersects the tensioner housing at an axial distance from a guiding surface of the guide shoe which corresponds between 0 and 40% of the axial transport length of the tensioner between the guiding surface of the guide shoe and a tensioning surface of the tensioning shoe at a locked transport position of the tensioner; and wherein the camshaft bearing bridge has a contact surface for receiving the fastening flange, wherein the mounting surface of the fastening flange is in contact with said contact surface for fixing the camshaft bearing bridge to the engine block component.

9. The camshaft-camshaft chain drive for an internal combustion engine according to claim 8, wherein the fastening flange of the tensioner has at least one fastening hole formed in the mounting surface, a fastener of the camshaft bearing bridge extending through the at least one fastening hole of the fastening flange so as to fix the camshaft bearing bridge to the engine block component by means of the fastening flange.

* * * * *